Patented Feb. 10, 1931

1,792,130

UNITED STATES PATENT OFFICE

KARL THIESS, THEODOR MEISSNER, AND HANS HEYNA, OF FRANKFORT-ON-THE-MAIN-HOCHST, GERMANY, ASSIGNORS TO GENERAL ANILINE WORKS, INC., OF NEW YORK, N. Y., A CORPORATION OF DELAWARE

VAT DYESTUFFS OF THE INDIGO SERIES

No Drawing. Application filed January 22, 1929, Serial No. 334,348, and in Germany February 7, 1928.

The present invention relates to new vat dyestuffs of the indigo series, more particularly to the indigoid dyestuffs of the following general formula:

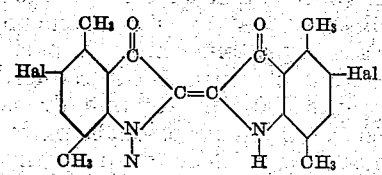

Objects of our invention are the new dyestuffs as well as the materials dyed therewith.

We have found that dyestuffs of a pure-blue tint and an excellent fastness to washing, boiling and chlorine are obtainable by transforming amino compounds of the following general formula:

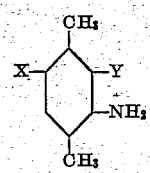

wherein X stands for halogen and Y stands for hydrogen or the COOH group, into indigo dyestuffs according to the process generally used for the preparation of indigo dyestuffs from aromatic amino compounds with a free ortho-position, or from ortho-aminocarboxylic acids.

There may also be used as starting material amino compounds of the formula above indicated, wherein X stands for hydrogen. In this case, 4.7-4'.7'-tetramethylindigo is at first obtained which is then converted into 4.7-4'.7'-tetramethyl-5.5'-dihalogenindigo by treating it with a quantity of a halogen, or of an agent capable of splitting off halogen, sufficient for effecting the introduction of 2 halogen atoms.

For the preparation of the halogen-containing as well as of the dyestuffs free from halogen all methods may be used, as for instance the fusion of caustic alkali and sodium amide with the correspondingly substituted phenylglycine, the condensation of the correspondingly substituted phenylglycine-ortho-carboxylic acid, for instance with the aid of acetic anhydride, or the well-known process according to which the correspondingly substituted phenyl-amino-malonic acid esters are used as intermediate products.

The dyestuffs may likewise be obtained by the reduction of suitable substituted isatine-α-compounds, etc.

The following examples serve to illustrate our invention, but they are not intended to limit it thereto; the parts are by weight.

(1) 27.5 parts of 4.7-dimethyl-5-bromisatine of the melting point 290° C. to 292° C. and 24 parts of phosphorus pentachloride are suspended in 200 parts of anhydrous chlorobenzene while stirring. The mixture is heated within 1 hour to the boiling point of chlorobenzene, the boiling temperature being maintained until the evolution of hydrochloric acid has almost entirely ceased. Into this solution of 4.7-dimethyl-5-bromisatine-α-chloride, hydrogen sulfide is introduced, preferably at a temperature of between 40° C. and 50° C. until precipitation of the dyestuff can no longer be observed and isatine is no longer present.

After cooling, the so formed 4.7-4'.7'-tetramethyl-5.5'-dibromindigo of the following probable formula:

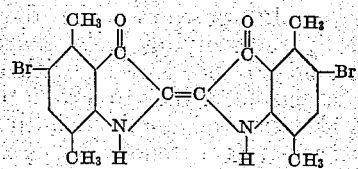

is filtered with suction and washed with alcohol. The dyestuff dissolves in chloroform, benzene, chlorobenzene, aniline and nitrobenzene to a blue solution; it is almost insoluble in alcohol, ether and benzine. It dissolves in sulfuric acid to a green solution. It dyes the fiber from an olive-green vat a pure-blue tint. The dyeings are distinguished by a great fastness to washing, boiling and to chlorine.

(2) If in Example 1 the 4.7-dimethyl-5-bromisatine is replaced by 21 parts of 4.7-dimethyl-5-chlorisatine having a melting point of between 277° C. and 279° C. and the further treatment is carried out as indicated in Example 1, 4.7-4′.7′-tetramethyl-5.5′-dichlorindigo is obtained. As regards its properties, the dyestuff obtained in the above described manner is very similar to that obtainable according to Example 1. It dissolves in sulfuric acid to a green solution and dyes the fiber from an olive-green vat almost the same tint and with the same fastness to washing and boiling and chlorine as the dyestuff obtainable according to Example 1. The dyestuff has the following formula

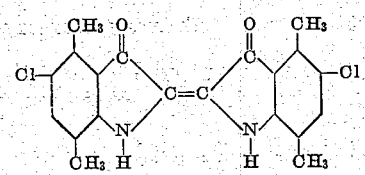

(3) 199.5 parts of 3.6-dimethyl-5-chloro-2-amino-1-benzoic acid of the melting point 188° C. to 190° C. are boiled on the reflux condenser with 120 parts of mono-chloroacetic acid and 200 parts of sodium carbonate in 5000 parts by volume of water for about 6 hours until no diazotizable substance can any longer be detected. After cooling, the resulting 2.5-dimethyl-4-chloro-phenyl-glycine-6-carboxylic acid is precipitated by means of hydrochloric acid, the mass is filtered with suction, washed and dried. 26 parts of the said acid are heated with 150 parts of acetic anhydride and 10 parts of anhydrous sodium acetate to boiling until no further evolution of carbonic acid is observed. The acetic anhydride is then distilled in vacuo and the residue is washed with water.

The resulting acetyl-indoxyl derivative is heated in an alkaline solution on the steam bath and the 4.7-4′.7′-tetramethyl-5.5′-dichlorindigo is obtained by blowing air through the solution. The product is filtered with suction, washed with water and dried. It forms a blue powder. The dyestuff is purified by redissolving it in concentrated sulfuric acid. It is identical with the dyestuff obtained according to Example 2.

(4) 156 parts of 4-chlor-2.5-dimethyl-1-aminobenzene are heated to boiling for about 8 hours with 120 parts of the diethyl ester of bromo-malonic acid in 1000 parts by volume of denatured alcohol. After cooling the hydrobromide of 4-chloro-2.5-dimethyl-1-aminobenzene is filtered off. When the alcohol has been distilled off 2.5-dimethyl-4-chloro-phenyl-amino-malonic acid-diethyl ester is left in the filtrate in the form of a viscous oil. 100 parts of this compound are heated in a round-bottomed flask, provided with an inclined condenser to a temperature of 180° C. until alcohol does no longer distil over, and then the residue is poured into 500 parts by volume of water. After addition of 200 parts by volume of a caustic soda solution of 40° Bé. and 1500 parts by volume of water, the mass is boiled on a reflux condenser for about 5 hours, and then the impurities contained therein are filtered off. By blowing air through the mass 4.7-4′.7′-tetra-methyl-5.5′-dichlorindigo is obtained which is identical with the dyestuff obtainable according to Example 2.

(5) 18 parts of dry 2.5-dimethylphenyl-glycine are intimately mixed with 30 parts of powdered caustic soda and 8 parts of sodium amide and the mixture is heated until it melts. When the evolution of ammonia has finished and the melt shows a pure-yellow coloration, the mass is allowed to cool and is dissolved in water; air is then blown through until the dyestuff is completely precipitated. The resulting 4.4′.7.7′-tetramethyl indigo dissolves in concentrated sulfuric acid to a green solution and dyes the fiber from an olive-green vat grayish-blue tints. 32 parts of the dyestuff thus obtained are introduced while stirring into 300 parts of anhydrous nitrobenzene. To this suspension, 35 parts of bromine are slowly added drop by drop, and stirring is continued for some time at room temperature and the mass is finally heated for 6-8 hours up to a temperature of from 140° C. to 160° C. At this temperature the mass is stirred until the evolution of hydrogen bromide has ceased. After cooling, the dyestuff is filtered with suction and freed from any adhering solvent by washing it with alcohol. As regards its properties, the dyestuff obtained in this manner, namely 4.7-4′.7′-tetramethyl-5.5′-dibromindigo, is identical with that obtained according to Example 1.

We claim:

1. As new products, the dyestuffs of the following general formula:

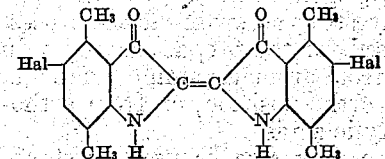

being in the dry state blue powders dissolving in concentrated sulfuric acid to a green solution, yielding with an alkaline hydrosulfite solution olive-green vats from which fibers are dyed pure-blue tints of good fastness to washing, boiling and chlorine.

2. As a new product, the dyestuff of the following formula:

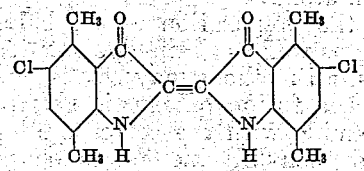

being in the dry state a blue powder dissolving in concentrated sulfuric acid to a green solution, yielding with an alkaline hydrosulfite solution an olive-green vat from which fibers are dyed pure-blue tints of good fastness to washing, boiling and chlorine.

In testimony whereof we affix our signatures.

KARL THIESS.
THEODOR MEISSNER.
HANS HEYNA.

Certificate of Correction

Patent No. 1,792,130. Granted February 10, 1931, to

KARL THIESS ET AL

It is hereby certified that error appears in the printed specification of the above-numbered patent requiring correction as follows: Page 1, lines 5 to 10, strike out the formula and insert instead

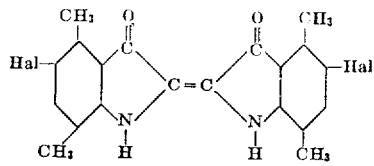

and that the said Letters Patent should be read with this correction therein that the same may conform to the record of the case in the Patent Office.

Signed and sealed this 24th day of March, A. D. 1931.

[SEAL.]

M. J. MOORE,
*Acting Commissioner of Patents.*